(12) United States Patent
Nanri et al.

(10) Patent No.: US 8,130,632 B2
(45) Date of Patent: Mar. 6, 2012

(54) TRANSMITTER AND SSB SIGNAL GENERATION METHOD

(75) Inventors: Masahiko Nanri, Yokohama (JP); Yuta Seki, Yokohama (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 12/594,918

(22) PCT Filed: Apr. 6, 2007

(86) PCT No.: PCT/JP2007/057780

§ 371 (c)(1),
(2), (4) Date: Oct. 6, 2009

(87) PCT Pub. No.: WO2008/129609

PCT Pub. Date: Oct. 30, 2008

(65) Prior Publication Data

US 2010/0124162 A1  May 20, 2010

(51) Int. Cl.
*H04J 11/00* (2006.01)
(52) U.S. Cl. ......... 370/210; 370/203; 370/252; 375/260
(58) Field of Classification Search .................. 370/203, 370/206, 208, 210, 215, 252, 310, 328, 343, 370/344, 345, 350, 330, 480, 465, 442, 464; 375/260, 265, 285, 295, 296, 343, 346, 348; 455/446, 448, 114.2, 127.1, 450, 522
See application file for complete search history.

(56) References Cited

U.S. PATENT DOCUMENTS

| | | | |
|---|---|---|---|
| 6,091,781 A | | 7/2000 | Mujtaba |
| 6,339,621 B1 * | | 1/2002 | Cojocaru et al. .............. 375/247 |
| 6,359,897 B1 * | | 3/2002 | Hessel et al. .................. 370/429 |
| 2001/0024475 A1 * | | 9/2001 | Kumar ........................... 375/270 |
| 2002/0196863 A1 * | | 12/2002 | Kaku et al. ..................... 375/285 |
| 2003/0058961 A1 * | | 3/2003 | Fling et al. ..................... 375/316 |
| 2004/0091057 A1 * | | 5/2004 | Yoshida ......................... 375/260 |
| 2005/0018598 A1 * | | 1/2005 | Borran et al. ................. 370/208 |
| 2005/0185669 A1 * | | 8/2005 | Welborn et al. .............. 370/465 |
| 2006/0050624 A1 * | | 3/2006 | Akita ............................ 370/208 |
| 2006/0087961 A1 * | | 4/2006 | Chang et al. .................. 370/203 |

(Continued)

FOREIGN PATENT DOCUMENTS

JP  11-239189 A  8/1999

OTHER PUBLICATIONS

International Search Report, mailed May 1, 2007, issued in corresponding International Application No. PCT/JP2007/057781, filed Apr. 6, 2007.

Mujtaba, S., "A Novel Scheme for Transmitting QPSK as a Single-Sideband Signal," Proceedings of GLOBECOM 98, The Bridge to Global Integration, Global Telecommunications Conference, Sydney, Nov. 11-12, 1998, 1:592-597.

(Continued)

*Primary Examiner* — Aung S Moe
*Assistant Examiner* — Abdullah Riyami
(74) *Attorney, Agent, or Firm* — Dickinson Wright PLLC

(57) ABSTRACT

A transmitter which is capable of producing an SSB signal having a sharp spectrum cut. The transmitter generates the SSB signal using an FFT circuit (103) which Fourier-transforms a transmission symbol, a zero insertion circuit (104) which zeros the component of either the USB component signal or the LSB component signal outputted from the FFT circuit (103), an IFFT circuit (105) which inverse-Fourier-transforms the output from the zero insertion circuit (104), and a parallel-serial conversion circuit (106) which parallel-serial-converts the output from the IFFT circuit (105).

4 Claims, 13 Drawing Sheets

U.S. PATENT DOCUMENTS

| | | | | |
|---|---|---|---|---|
| 2006/0268675 A1* | 11/2006 | Cho et al. | ...................... | 370/210 |
| 2007/0002728 A1* | 1/2007 | Fujii et al. | ...................... | 370/210 |
| 2007/0092018 A1* | 4/2007 | Fonseka et al. | ............... | 375/265 |
| 2007/0237067 A9* | 10/2007 | Borran et al. | ................. | 370/208 |
| 2008/0095040 A1* | 4/2008 | Kwon et al. | .................. | 370/210 |
| 2010/0091903 A1* | 4/2010 | Castelain et al. | ............. | 375/295 |
| 2010/0322322 A1* | 12/2010 | Kodama et al. | ............... | 375/257 |

OTHER PUBLICATIONS

Mujtaba, S., "Performance Analysis of Coded SSB-QPSK in Mobile Radio Channels," Proceedings of 1998 USRI International Symposium on Signals, Systems, and Electronics, Pisa, Italy, Sep. 29-Oct. 2, 1998, pp. 112-117.

* cited by examiner x(t)

H[x(t)]

H[H[x(t)]]= -x(t)

-H[x(t)]

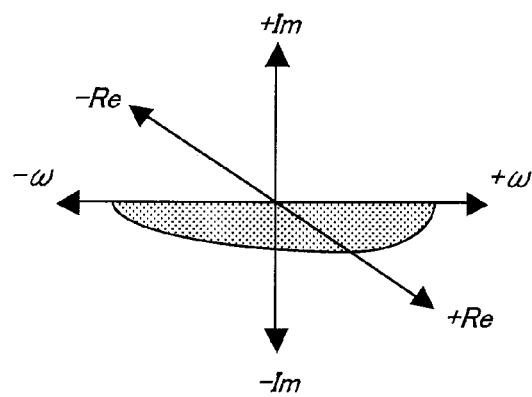
FIG.2A     $x(t)$
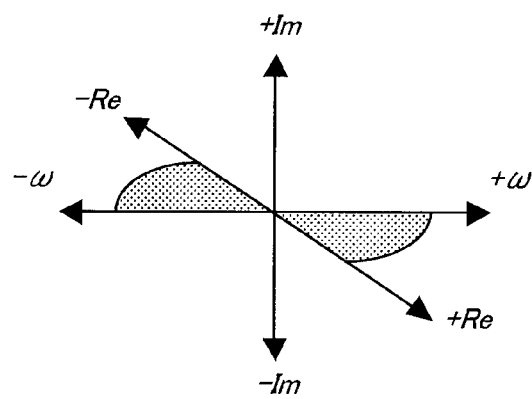
FIG.2B     $jH[x(t)]$
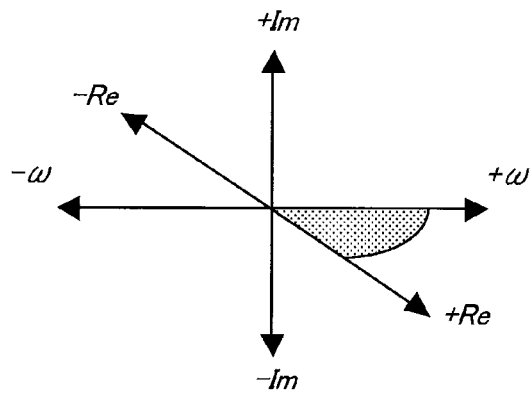
FIG.2C     $x(t)+jH[x(t)]$

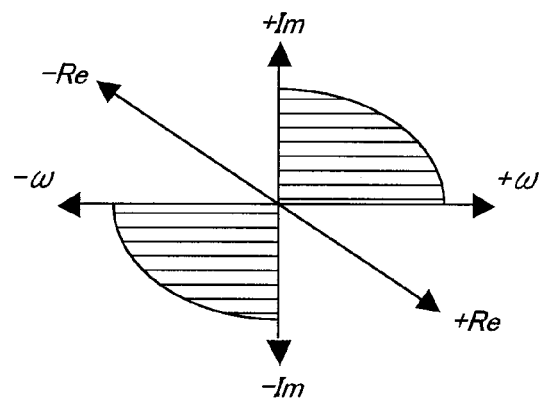
FIG.3A  −H [x(t)]
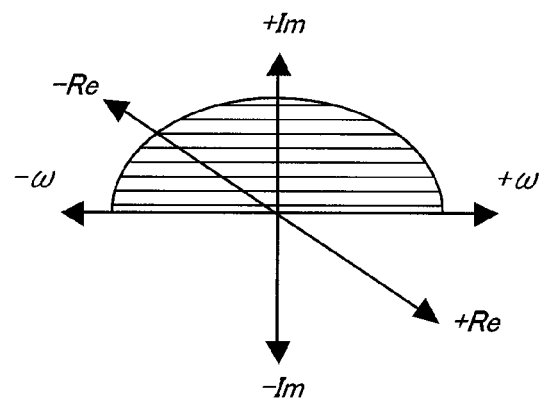
FIG.3B  jx(t)
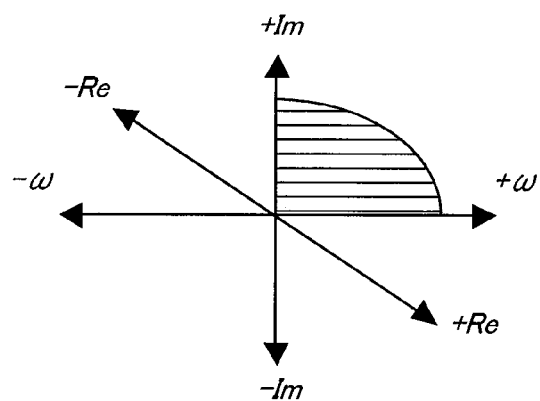
FIG.3C  −H [x(t)]+jx(t)

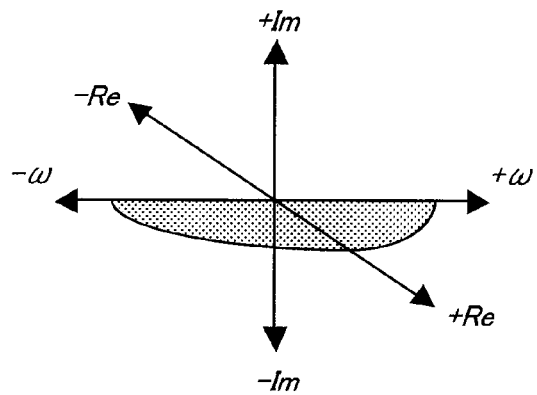
FIG.4A  x(t)
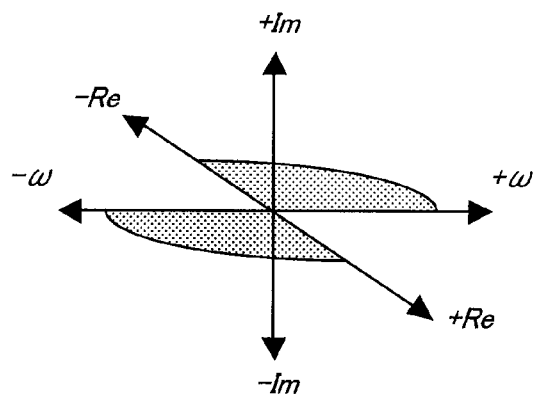
FIG.4B  −jH [x(t)]
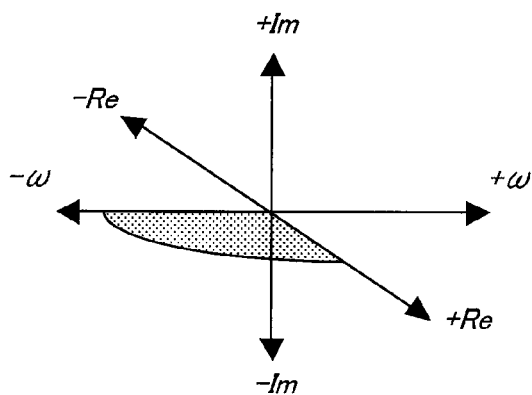
FIG.4C  x(t)−jH [x(t)]

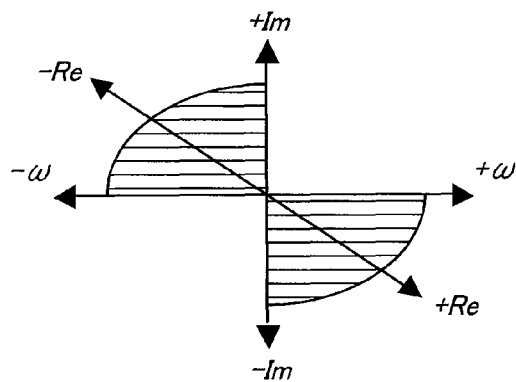
FIG.5A  $H[x(t)]$
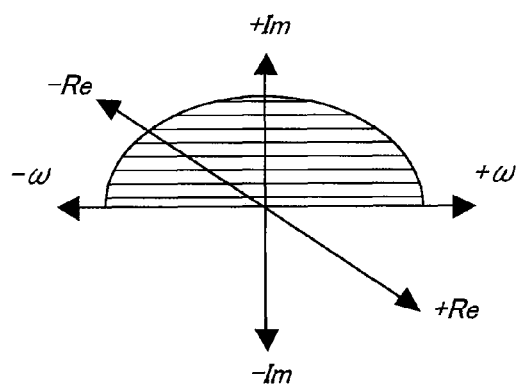
FIG.5B  $jx(t)$
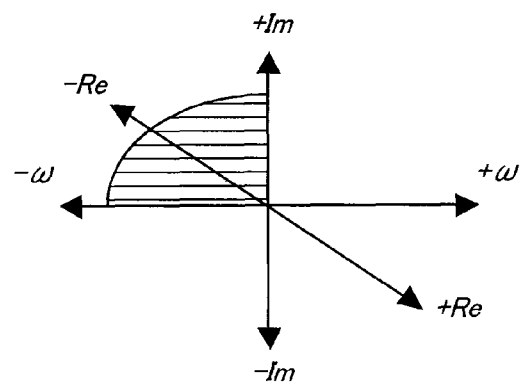
FIG.5C  $H[x(t)]+jx(t)$

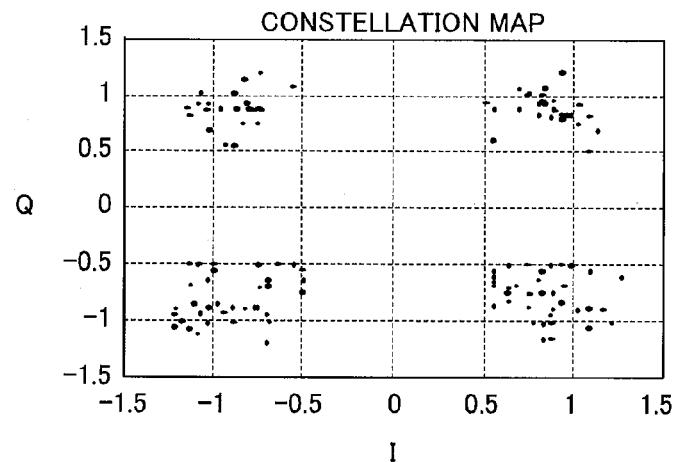
FIG.10A    Ntap=101 (EVM=-4.48[dB])
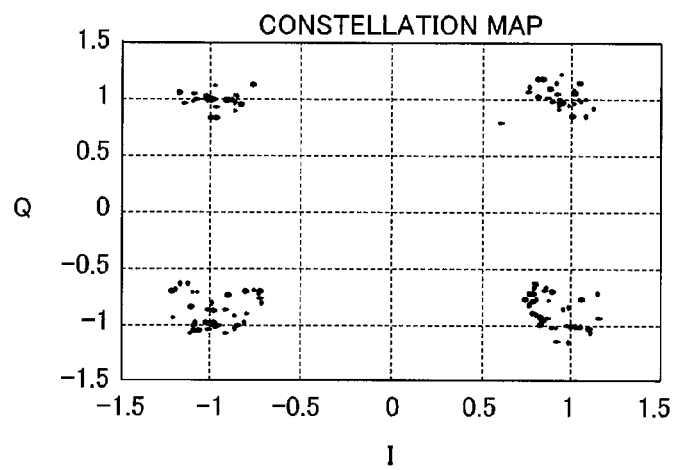
FIG.10B    Ntap=201 (EVM=-5.04[dB])
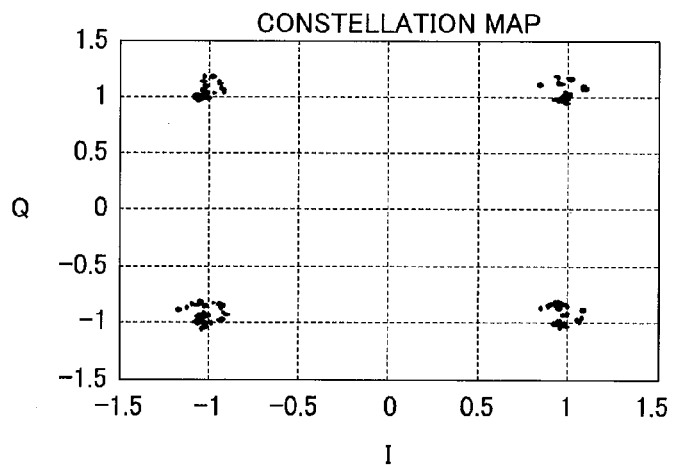
FIG.10C    Ntap=501 (EVM=-6.57[dB])

TRANSMITTER AND SSB SIGNAL GENERATION METHOD

TECHNICAL FIELD

The present invention relates to a transmitting apparatus and SSB signal forming method for making transmission signals SSB (Single Side Band) signals and transmitting the SSB signals.

BACKGROUND ART

SSB technology is a conventional technology for narrowing the bandwidth of transmission signals. SSB technology was actively studied in the prime time of analogue communication, and a Weaver-SSB scheme is a representative scheme. By contrast with this, for example, the RZ-SSB scheme and SSB-QPSK scheme (i.e. Mujtaba scheme) are representative schemes in the area of digital communication. The Mujtaba scheme is introduced in, for example, Non-Patent Document 1 and Non-Patent Document 2.

In digital SSB technology, the Hilbert transform is very important. Here, the basics of the Hilbert transform will be explained.

(1) Hilbert Transform

When the Fourier transform of a continuous time signal x(t) is represented as X(ω), the Hilbert transform H[X(ω)] of X(ω) in the frequency domain is represented by the following equation:

(Equation 1)

$$H[X(\omega)] = -j\,\mathrm{sgn}(\omega)X(\omega) \quad [1]$$

where $$\mathrm{sgn}(\omega) = \begin{cases} 1 & \omega > 0 \\ 0 & \omega = 0 \\ -1 & \omega < 0 \end{cases}$$

By contrast with this, the Hilbert transform H[x(t)] in the time domain x(t) is defined as the inverse Fourier transform of H[X(ω)], and is represented by the following equation. Here, in the following equation, $F^{-1}$ stands for the inverse Fourier transform and * stands for convolution operation.

(Equation 2)

$$\begin{aligned} H[x(t)] &= F^{-1}[H[X(\omega)]] = F^{-1}[-j\,\mathrm{sgn}(\omega)X(\omega)] \quad [2] \\ &= F^{-1}[-j\,\mathrm{sgn}(\omega)] * F^{-1}[X(\omega)] \\ &= \frac{1}{\pi} * x(t) \\ &= \frac{1}{\pi}\int_{-\infty}^{\infty}\frac{x(\tau)}{t-\tau}d\tau \end{aligned}$$

X(ω) and H[x(ω)] change only the phases and, consequently, x(t) and H[x(t)] have the same power spectra and auto-correlation functions. Further, the relationship of the following equation holds between x(t) and H[x(t)].

(Equation 3)

$$\begin{aligned} \int_{-\infty}^{\infty} x^*(t)\cdot H[x(t)]\,dt &= \int_{-\infty}^{\infty} F^{-1}[X^*(\omega) * H[X(\omega)]]\,dt \quad [3]\\ &= \frac{1}{2\pi}\int_{-\infty}^{\infty}\int_{-\infty}^{\infty} X^*(\omega) * H[X(\omega)]\\ &\quad e^{j\omega t}\,d\omega\,dt\\ &= \frac{1}{2\pi}\int_{-\infty}^{\infty}\int_{-\infty}^{\infty}\int_{-\infty}^{\infty} X^*(\omega - \omega')\\ &\quad H[X(\omega')]\,d\omega'\,e^{j\omega t}\,d\omega\,dt\\ &= \int_{-\infty}^{\infty}\int_{-\infty}^{\infty} x^*(t)e^{-j\omega' t}H[X(\omega')]\,d\omega'\,dt\\ &= \int_{-\infty}^{\infty} X^*(\omega')H[X(\omega')]\,d\omega'\\ &= \int_{-\infty}^{\infty} (-j)\mathrm{sgn}(\omega')X^*(\omega')X(\omega')\,d(\omega')\\ &= -j\int_{-\infty}^{\infty} \mathrm{sgn}(\omega')|X(\omega')|^2\,d(\omega')\\ &= 0 \end{aligned}$$

That is, H[x(t)] and the complex conjugate x*(t) of x(t) are orthogonal to each other.

Next, how the spectrum of a continuous time signal changes by the Hilbert transform will be graphically explained. Here, a case will be studied where, as shown in FIG. 1A, x(t) is a continuous time signal formed with real domain frequency components alone. As shown in equation 1, the Hilbert transform H[x(t)] of x(t) is performed by multiplying the positive frequency components by −j and by multiplying the negative frequency components by +j. Therefore, with the spectrum of H[x(t)], only the imaginary domain frequency components are arranged symmetrically about the origin, as shown in FIG. 1B. Further, if H[x(t)] is subjected to the Hilbert transform, the spectrum appears only in the real domain as shown in FIG. 1C. Here, as is clear from equation 1, Cauchy's theorem applies to the Hilbert transform, and, consequently, energy is maintained throughout the process of the Hilbert transform. Accordingly, the following equation holds.

(Equation 4)

$$\begin{aligned} H[H[X(\omega)]] &= H[-j\,\mathrm{sgn}(\omega)X(\omega)] \quad [4]\\ &= -j\,\mathrm{sgn}(\omega)\{-j\,\mathrm{sgn}(\omega)X(\omega)\}\\ &= -\{\mathrm{sgn}(\omega)\}^2 X(\omega)\\ &= -X(\omega) \end{aligned}$$

When this equation is represented in the time domain, the following equation holds.

(Equation 5)

$$\begin{aligned} H[H[x(t)]] &= F^{-1}\{-X(\omega)\} \quad [5]\\ &= x(t) \end{aligned}$$

−H[x(t)] can be obtained (FIG. 1D) by further performing a Hilbert transform of the signal in FIG. 1C, and the original sequence x(t) can be obtained by further performing a Hilbert transform of −H[x(t)].

(2) USB and LSB Generating Method

Here, a method for generating a USB (Upper Side Band) and an LSB (Lower Side Band) utilizing the above-described characteristics of the Hilbert transform will be explained. Similar to above, a transmission data sequence x(t) formed with real domain frequency components alone are studied. Here, a spectral representation of x(t) is as shown in FIG. 2A. As shown in FIG. 1B, when the Hilbert transform of x(t) is performed, x(t) is multiplied by j and the overall spectrum rotates 90 degrees in the positive domain, so that it is possible to acquire the spectrum shown in FIG. 2B.

The sequence acquired by performing coherent addition of the spectra shown in FIG. 2A and FIG. 2B is as follows.

(Equation 6)

$$X(\omega) + jH[X(\omega)] = X(\omega) + \text{sgn}(\omega)X(\omega) \quad [6]$$
$$= \begin{cases} 0 & \omega \leq 0 \\ 2X(\omega) & \omega > 0 \end{cases}$$

Equation 6 can be illustrated as shown in FIG. 2C. That is, a USB signal formed with real domain upper side band components alone can be acquired. A time domain representation of this USB signal is as represented by the following equation.

(Equation 7)

$$S_{USBre}(t) = x(t)jH[x(t)] \quad [7]$$

A USB signal $S_{USBim}(t)$ formed with imaginary components alone, an LSB signal $S_{LSBre}(t)$ formed with real components alone and an LSB signal $S_{LSBim}(t)$ formed with imaginary components alone are generated by the same methods as described above. To be more specific, the process of forming the USB signal $S_{USBim}(t)$ with imaginary components alone is as shown in FIG. 3A, FIG. 3B and FIG. 3C, and the result is represented by equation 8. Further, the process of forming an LSB signal $S_{LSBre}(t)$ with the real components alone is as shown in FIG. 4A, FIG. 4B and FIG. 4C, and the result is represented by equation 9. Furthermore, the process of forming an LSB signal $S_{LSBim}(t)$ with imaginary components alone is as shown in FIG. 5A, FIG. 5B and FIG. 5C, and the result is represented by equation 10.

(Equation 8)

$$S_{USBim}(t) = -H[x(t)] + jx(t) \quad [8]$$

(Equation 9)

$$S_{LSBre}(t) = x(t) - jH[x(t)] \quad [9]$$

(Equation 10)

$$S_{LSBim}(t) = H[x(t)] + jx(t) \quad [10]$$

(3) Mujtaba Scheme

Next, the Mujtaba scheme, which is a typical example of a digital SSB modulation scheme, will be explained. Further, the Mujtaba scheme is introduced in, for example, Non-Patent Document 1 and Non-Patent Document 2. This scheme is directed to alleviating deterioration of performance due to fading, by narrowing the bandwidth of each bit stream of I-axis components and Q-axis components in QPSK by means of SSB technology.

FIG. 6 shows the configuration of a transmitting apparatus that employs the Mujtaba scheme. Further, FIG. 7 shows the configuration of a receiving apparatus that employs the Mujtaba scheme.

In transmitting apparatus 10 in FIG. 6, first, data generating section 11 generates transmission data, and serial-to-parallel converting section (S/P section) 12 performs serial-to-parallel conversion of the generated transmission data. Further, in transmitting apparatus 10, oversampling sections 13 and 14 oversamples the transmission sequences x(t) and y(t) subjected to serial-to-parallel conversion, and then inputs transmission sequences x(t) and y(t) in root Nyquist filters 15 and 16. Root Nyquist filters 15 and 16 send out filter outputs u(t) and v(t), to SSB signal forming/multiplexing section 17.

SSB signal forming/multiplexing section 17 inputs the filter output u(t) to delayer 18 and Hilbert transformer 19, and inputs the filter output v(t) to Hilbert transformer 20 and delayer 21.

Hilbert transformers 19 and 20 are each formed with an FIR filter of a tap coefficient 1/πt (see equation 2). Delayers 18 and 21 delay input signals by the time required for a Hilbert transform, and outputs the input signals.

The output of delayer 18, the output of Hilbert transformer 19, the output of Hilbert transformer 20 and the output of delayer 21 are sent out to multiplier 24, multiplier 25, multiplier 26 and multiplier 27, respectively. Further, the carrier frequency signal (cos $\omega_c t$) generated in carrier frequency signal generator 22 is received as input in multipliers 24 and 26, and a carrier frequency signal (sin $\omega_c t$) having a phase, shifted by 90 degrees in phase shifter 23, is received as input in multipliers 25 and 27. By this means, multipliers 24 and 26 multiply the outputs of delayer 18 and Hilbert transformer 20 by the carrier frequency signal (cos $\omega_c t$), and multipliers 25 and 27 multiply the outputs of Hilbert transformer 19 and delayer 21 by the carrier frequency signal (sin $\omega_c t$) having a phase shifted 90 degrees.

Adder 28 subtracts the output of multiplier 25 from the output of multiplier 24, and adder 29 adds the outputs of multiplier 26 and multiplier 27. Further, adder 30 adds the outputs of adder 28 and adder 29, so that an SSB modulated wave $S_{SSB-QPSK}(t)$ is acquired. That is, $S_{SSB-QPSK}(t)$ is represented by the following equation.

(Equation 11)

$$S_{SSB-QPSK}(t) = \{u(t) + H[v(t)]\} \cos \omega_c t + \{-H[u(t)] + v(t)\} \sin \omega_c t \quad [11]$$

FIG. 8 shows the spectrum of the SSB modulated wave $S_{SSB-QPSK}(t)$.

Next, the configuration of the receiving apparatus that demodulates signals according to the Mujtaba scheme will be explained. As is clear from equation 11, if normal quadrature detection is performed in demodulation, desired data sequences u(t) and v(t) and Hilbert transform components H[v(t)] and H[u(t)] in a pair of branches, appear in a linearly combined form respectively. If demodulation processing is performed in this state, H[v(t)] and H[u(t)] cause interference, thereby deteriorating received performance significantly. Then, with the Mujtaba scheme, the receiving side removes unnecessary Hilbert transform components by performing coherent addition of desired data sequences and Hilbert transform components orthogonal to the desired sequences. This is referred to as the "double branch method."

Hereinafter, the double branch method will be explained using FIG. 7. First, receiving apparatus 40 multiplies a received signal $S_{SSB-QPSK}(t)$ by the carrier frequency signal (cos $\omega_c t$) in quadrature detection section 41 similar to normal quadrature detection, and makes the multiplication result to pass low pass filter (LPF 42) to extract the in-phase components of the received signal $S_{SSB-QPSK}(t)$. The output of low pass filter 42 is represented by the following equation.

(Equation 12)
$$I(t) = S_{SSB-QPSK}(t)\cos\omega_c t \mid_{LPF} \quad [12]$$
$$= u(t) + H[v(t)]$$

In parallel with this, receiving apparatus 40 multiplies the received signal $S'_{SSB-QPSK}(t)$ by the carrier frequency signal (sin $\omega_c t$) in quadrature detection section 41 and makes the multiplication result pass low pass filter (LPF) 43 to extract the quadrature components of the received signal $S'_{SSB-QPSK}(t)$, and further performs a Hilbert transform of the quadrature components in Hilbert transformer 47. As a result of this processing, the signal represented by the following equation can be acquired.

(Equation 13)
$$H[Q(t)] = H_{SSB-QPSK}(t)\sin\omega_c t \mid_{LPF} \quad [13]$$
$$= -u(t) + H[v(t)]$$

Receiving apparatus 40 performs coherent addition of above I(t) and H[Q(t)] in adder 50 as shown in the following equation to remove the Hilbert transform components and acquire only the desired signal sequence u(t).

(Equation 14)
$$u'(t) = \frac{1}{2}\{I(t) - H[Q(t)]\} \quad [14]$$
$$= \frac{1}{2}[u(t) + H[v(t)] - \{-u(t) + H[v(t)]\}]$$
$$= u(t)$$

The signal sequence v'(t) in a pair of branches can be acquired in the same way. That is, receiving apparatus 40 multiplies the received signal $S'_{SSB-QPSK}(t)$ by the carrier frequency signal (cos $\omega_c t$) in quadrature detection section 41 and then makes the multiplication result pass low pass filter (LPF) 44 to extract the in-phase components of the received signal $S'_{SSB-QPSK}(t)$, and further performs a Hilbert transform of the in-phase components in Hilbert transformer 48.

Further, in parallel to this, receiving apparatus 40 multiplies the received signal $S'_{SSB-QPSK}(t)$ by the carrier frequency signal (sin $\omega_c t$) in quadrature detection section 41 and then makes the multiplication result pass low pass filter (LPF) 45 to extract the quadrature components of the received signal $S'_{SSB-QPSK}(t)$.

Receiving apparatus 40 performs coherent addition of H[I(t)] and Q(t) in adder 51 as represented by the following equation to remove the Hilbert transform components and acquire only the desired signal sequence v'(t).

(Equation 15)
$$v'(t) = \frac{1}{2}\{-H[I(t)] + Q(t)\} \quad [15]$$
$$= \frac{1}{2}[-\{H[u(t)] - v(t)\} + H[u(t)] + v(t)]$$
$$= v(t)$$

Receiving apparatus 40 acquires received data sequences x'(t) and y'(t) by inputting u'(t) and v'(t) acquired as described above, to threshold deciding sections 56 and 57, respectively, through root Nyquist filters 52 and 53 and down-sampling sections 54 and 55, and by performing hard decision processing in threshold deciding sections 56 and 57. Then, receiving apparatus 40 converts the received data sequences x'(t) and y'(t) into serial data in parallel-to-serial converting section (P/S section) 58.

Non-Patent Document 1: "A Novel Scheme for Transmitting QPSK as a Single-Sideband Signal," Syed Aon Mujtaba, IEEE Globalcomm. pp. 592-597, 1998

Non-Patent Document 2: "Performance Analysis of Coded SSB-QPSK in Mobile Radio Channels," Syed Aon Mujtaba, IEEE Globalcomm. pp. 112-117, 1998

DISCLOSURE OF INVENTION

Problems to be Solved by the Invention

As described above, the Hilbert transform needs to be performed to make transmission signals SSB signals. The Hilbert transform is generally realized by using an FIR filter having a tap coefficient $1/(\pi t)$.

However, there is a problem that the spectrum is not cut sharply if the tap coefficient of this FIR filter used in a Hilbert transform is not set to several hundreds.

FIG. 9 shows how an LSB spectrum changes when the tap coefficient used in a Hilbert transform changes. Here, the center frequency is 2[Hz]. As is clear from FIG. 9, even if the tap coefficient is set to around 100 to 200, power leaks to neighboring channels significantly, and, if the tap coefficient is set to 500, some power also leaks. Further, although not shown, the same power leakage from the USB is also confirmed.

FIG. 10 shows the received constellation at this time. Here, the channel environment provides one path static channel, and is free of noise. The conventional Mujtaba scheme adopts a spectrum arrangement in which the USB and LSB are closely provided and therefore has a problem that each neighboring channel is susceptible to the influence of power leakage. FIG. 10 shows this problem graphically.

It is therefore an object of the present invention to provide a transmitting apparatus and SSB signal forming method for acquiring SSB signals having spectra that are sharply cut.

Means for Solving the Problem

The transmitting apparatus according to the present invention employs a configuration which includes: a Fourier transform circuit that performs a Fourier transform of a transmission symbol; a zero insertion circuit that inserts zero in components of one of an upper side band component signal and a lower side band component signal outputted from the Fourier transform circuit; an inverse Fourier transform circuit that performs an inverse Fourier transform of an output of the zero insertion circuit; and a parallel-to-serial converting circuit that performs parallel-to-serial conversion of an output of the inverse Fourier circuit.

Advantageous Effects of Invention

The present invention can acquire SSB signals having spectra that are sharply cut, and prevent power from leaking to neighboring channels.

BRIEF DESCRIPTION OF DRAWINGS

FIG. 1 illustrates a Hilbert transform with respect to a continuous time signal x(t);
FIG. 2 illustrates a method of generating the USB using only real components;
FIG. 2A shows the spectrum of the continuous time signal x(t) formed with real domain frequency components alone;
FIG. 2B shows the spectrum of jH[x(t)];
FIG. 2C shows the spectrum of x(t)+jH[x(t)];
FIG. 3 illustrates a method of generating the USB using only imaginary components;
FIG. 3A shows the spectrum of −H[x(t)];
FIG. 3B shows the spectrum of jx(t);
FIG. 3C shows the spectrum of −H[x(t)]+jx(t);
FIG. 4 illustrates a method of generating the LSB using only real components;
FIG. 4A shows the spectrum of a continuous time signal x(t) formed with real domain frequency components alone;
FIG. 4B shows the spectrum of −jH[x(t)];
FIG. 4C shows the spectrum of x(t)−jH[x(t)];
FIG. 5 illustrates a method of generating the LSB formed with imaginary components alone;
FIG. 5A shows the spectrum of H[x(t)];
FIG. 5B shows the spectrum of jx(t);
FIG. 5C shows the spectrum of H[x(t)]+jx(t);
FIG. 9 shows the spectrum of an LSB signal matching the tap coefficient in a Hilbert transformer;
FIG. 10 shows the received constellation of the LSB signal matching the tap coefficient in the Hilbert transformer;
FIG. 10A shows the received constellation in case where the tap coefficient is 101;
FIG. 10B shows the received constellation in case where the tap coefficient is 201;
FIG. 10C shows the received constellation in case where the tap coefficient is 501.

BEST MODE FOR CARRYING OUT THE INVENTION

Hereinafter, embodiments of the present invention will be explained in detail with reference to the accompanying drawings.

Embodiment 1

Figure 11:
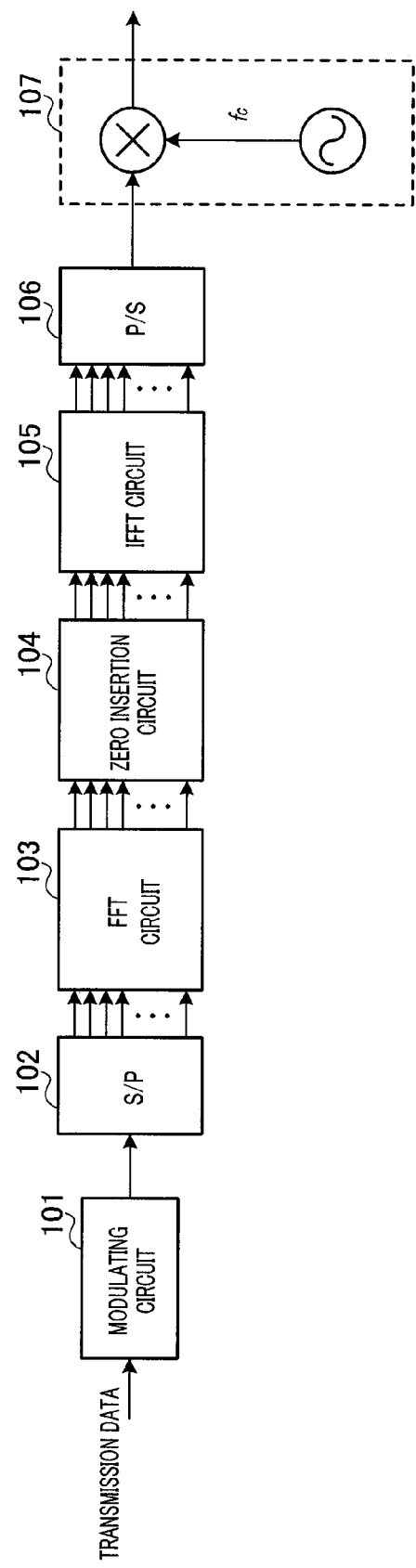
FIG. 11 is a block diagram showing the configuration of a transmitting apparatus according to Embodiment 1.

FIG. 11 shows the configuration of the transmitting apparatus according to Embodiment 1 of the present invention. Transmitting apparatus 100 inputs transmission data in modulating circuit 101. Modulating circuit 101 acquires modulated symbols by performing, for example, QPSK (Quadrature Phase Shift Keying) modulation.

A symbol acquired in modulating circuit 101 is sent out to serial-to-parallel modulating circuit (S/P) 102. S/P 102 makes symbols parallel that are sequentially received as input, and outputs the symbols. That is, S/P 102 makes the first to N-th symbols parallel that are sequentially received as input, and sends out the symbols to subsequent FFT circuit 103 at the same time.

FFT (Fast Fourier Transform) circuit 103 performs a fast Fourier transform of the inputted symbols, and sends out the signals after processing to zero insertion circuit 104.

Zero insertion circuit 104 inserts zero in the components of either the USB component signal or the LSB component signal outputted from FFT circuit 103. That is, zero insertion circuit 104 inserts zero in the LSB components when transmission is performed using the USB, and inserts zero in USB components when transmission is performed using the LSB. For example, when transmission is performed using the USB, outputs of sequences corresponding to the USB components among the outputs of N sequences in FFT circuit 103 are outputted to IFFT (Inverse Fast Fourier Transform) circuit 105, and signals of sequences corresponding to the LSB components are outputted as zero to IFFT circuit 105. In this way, zero insertion circuit 104 makes signals SSB signals.

Transmitting apparatus 100 converts transmission data sequences which are converted into frequency domain signals, into time domain signals by IFFT circuit 105 and parallel-to-serial converting circuit (P/S) 106. The signal converted in the time domain is converted into a radio signal by multiplying the time domain signal by the carrier wave fc in subsequent frequency converter 107, and is transmitted from an antenna (not shown).

Figure 1A:
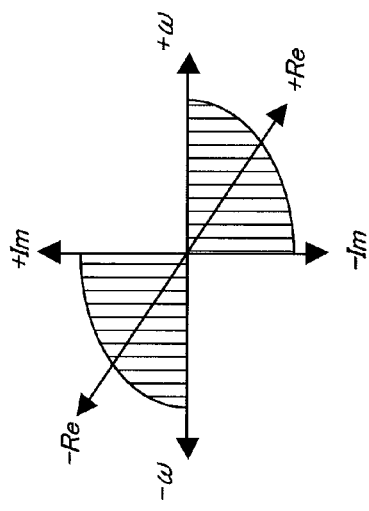
FIG. 1A shows the spectrum of the continuous time signal x(t) formed with real domain frequency components alone.
Figure 1B:
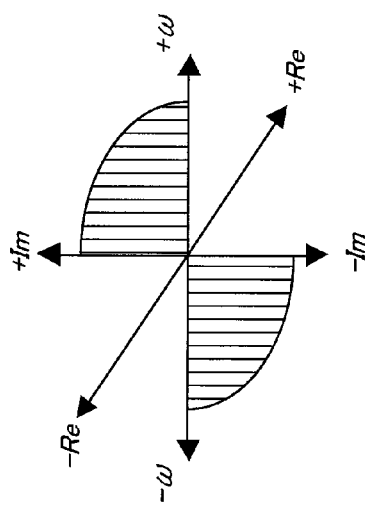
FIG. 1B shows the spectrum of H[x(t)]
Figure 1C:
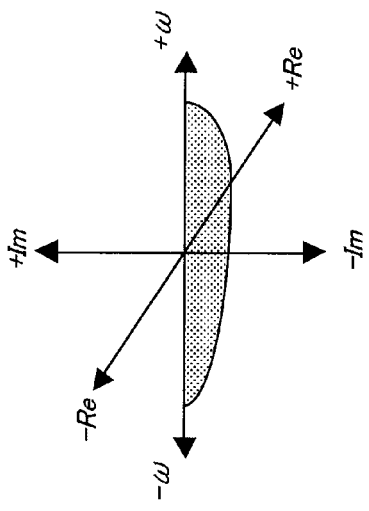
FIG. 1C shows the spectrum of H[H[x(t)]]
Figure 1D:
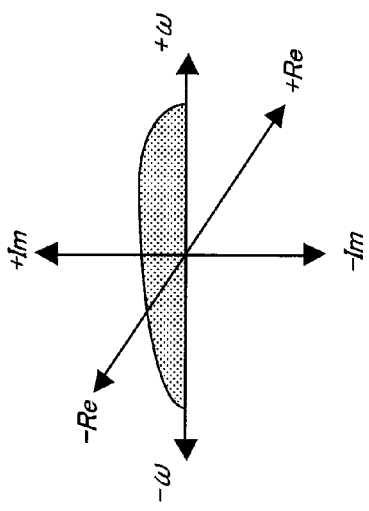
FIG. 1D shows the spectrum of −H[x(t)]
Figure 6:
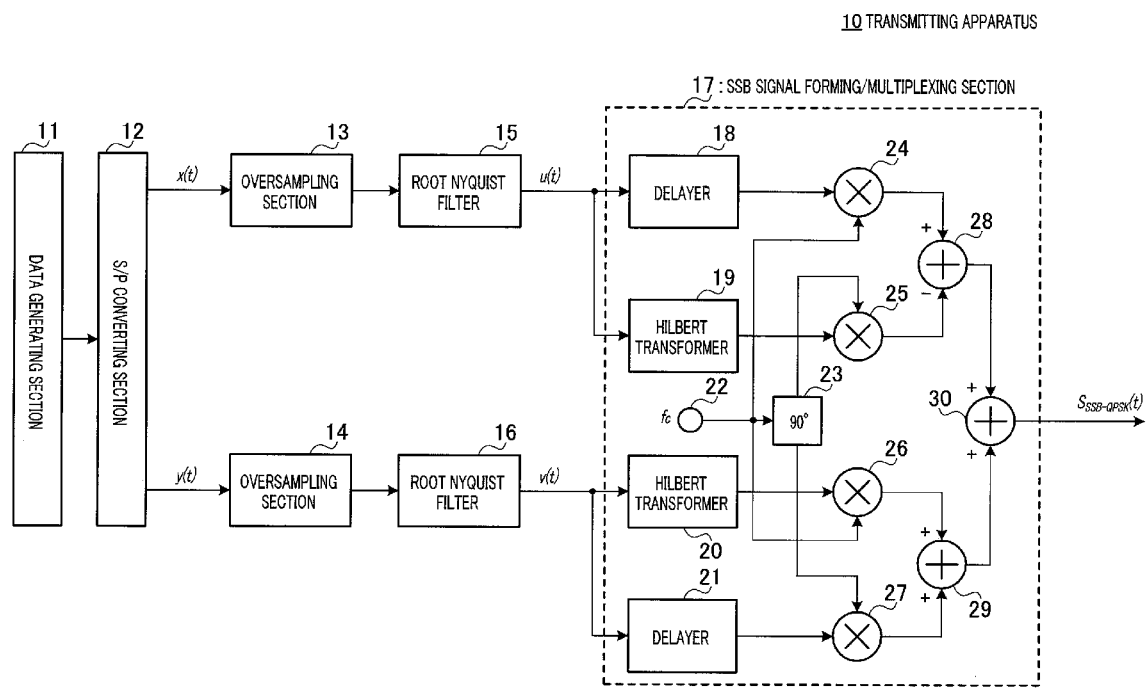
FIG. 6 is a block diagram showing the configuration of a conventional transmitting apparatus of the Mujtaba scheme.
Figure 7:
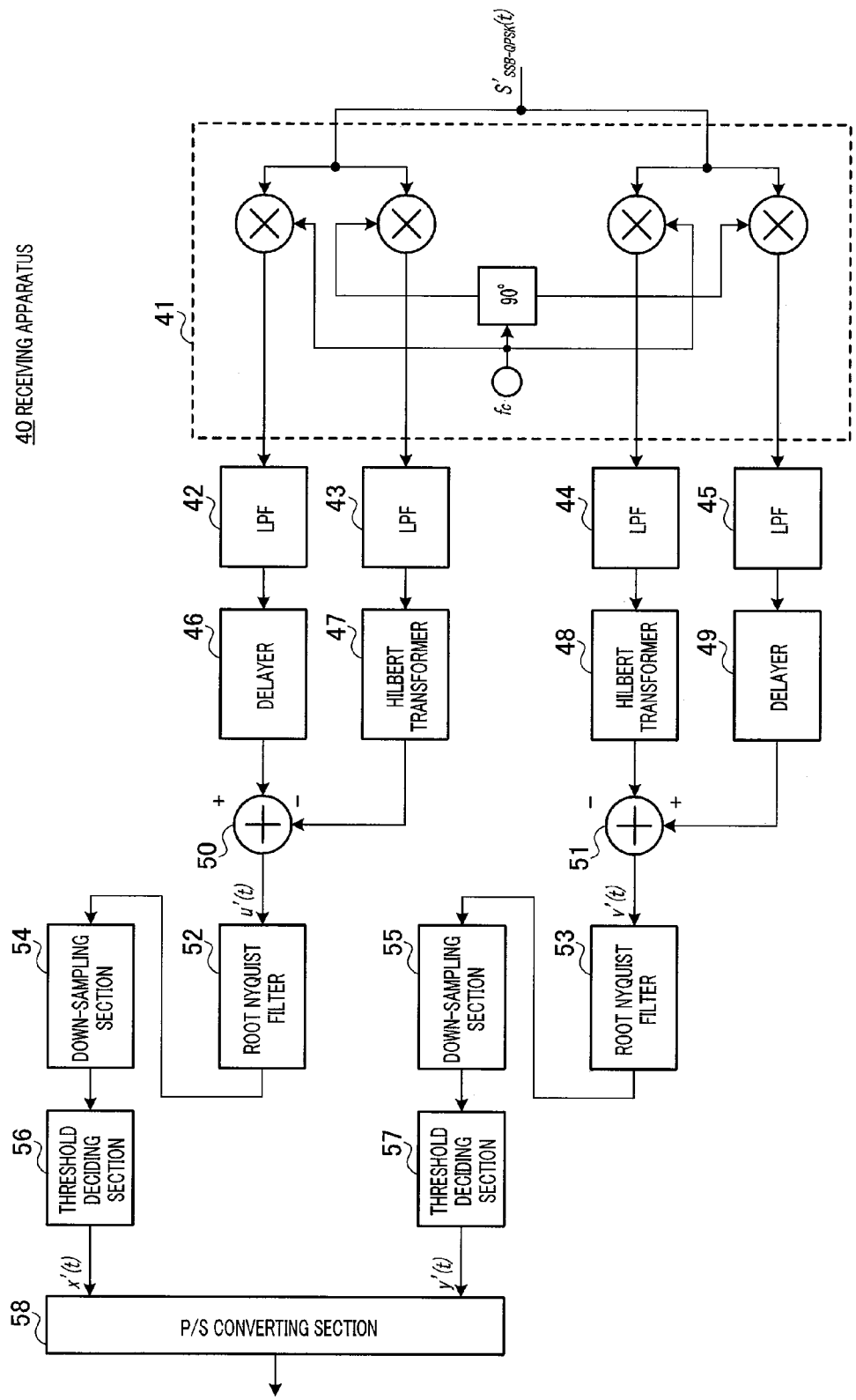
FIG. 7 is a block diagram showing the configuration of a conventional receiving apparatus of the Mujtaba scheme.
Figure 8:
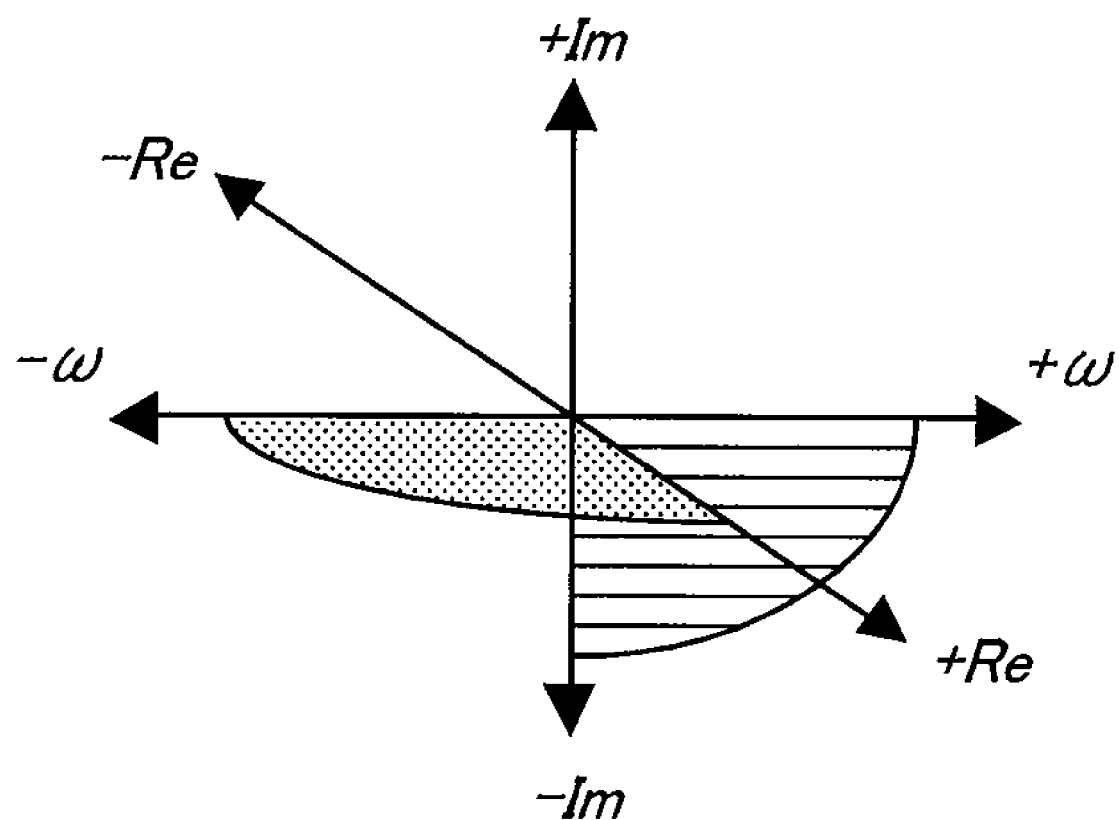
FIG. 8 shows the spectrum of an SSB-QPSK signal formed by the transmitting apparatus in FIG. 6.
Figure 9A:
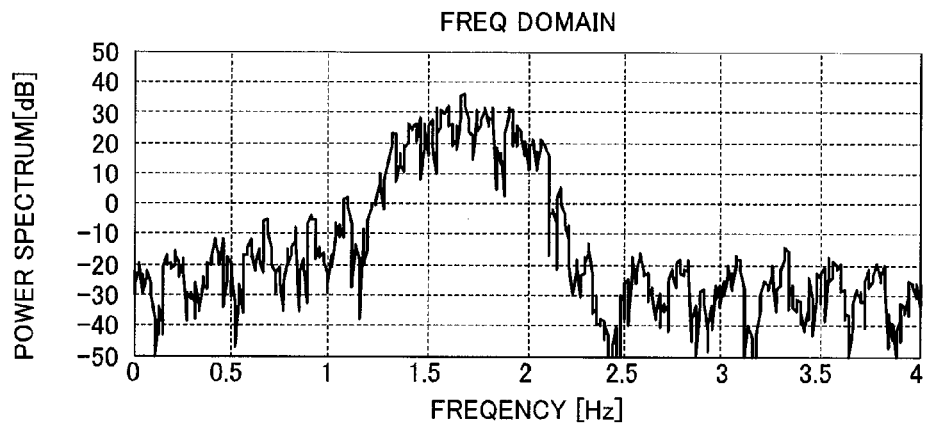
FIG. 9A shows the spectrum in case where the tap coefficient is 101.
Figure 9B:
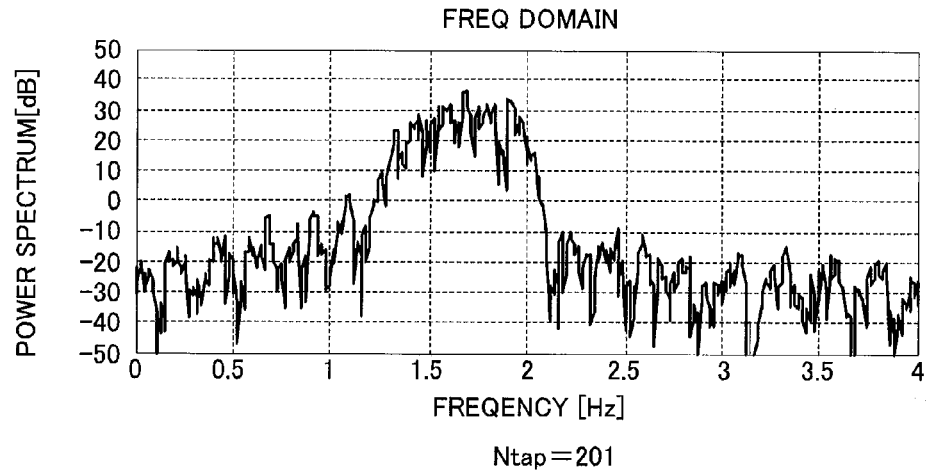
FIG. 9B shows the spectrum in case where the tap coefficient is 201.
Figure 9C:
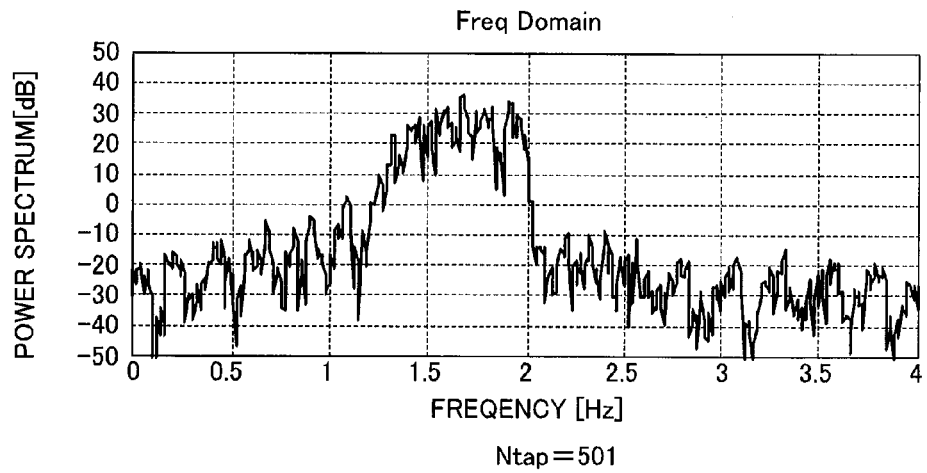
FIG. 9C shows the spectrum in case where the tap coefficient is 501.
Figure 12:
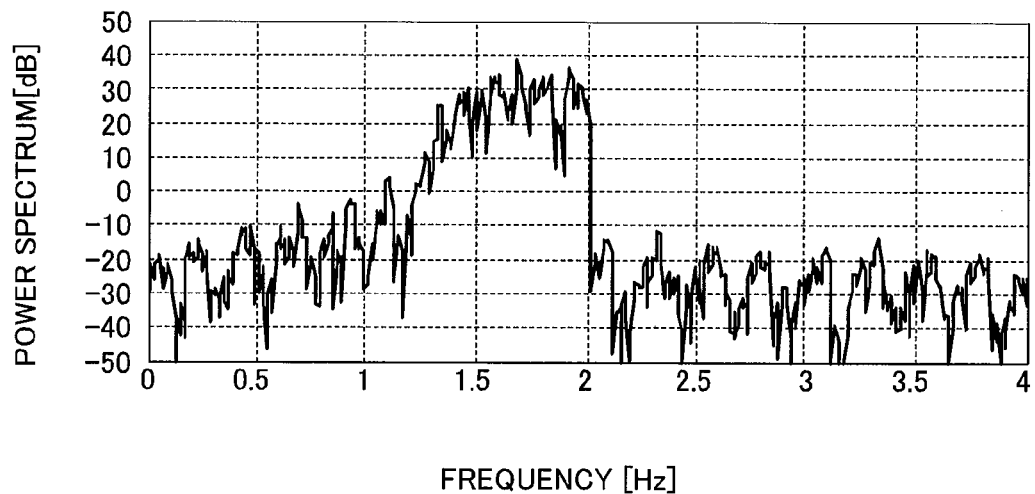
FIG. 12 shows the spectrum of an SSB signal formed by the transmitting apparatus according to Embodiment 1.

FIG. 12 shows, as a result of simulation, the frequency spectrum of an LSB signal (that is, in case where zero is inserted in the USB components by zero insertion circuit 104) formed by transmitting apparatus 100 according to the present embodiment. Meanwhile, this simulation is carried out assuming that the center frequency is 2[Hz]. As is clear from the comparison of FIG. 12 with FIG. 9, it is possible to acquire SSB signals having spectra that are sharply cut compared to a conventional configuration, by using transmitting apparatus 100.

Figure 13:
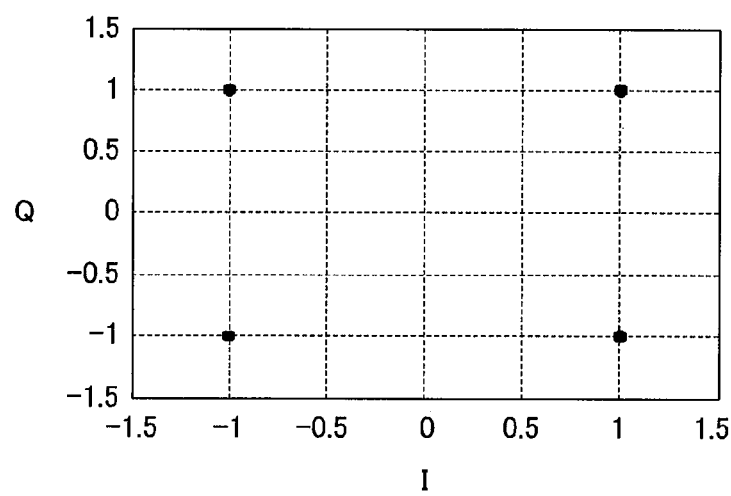
FIG. 13 shows the received constellation of the SSB signal formed by the transmitting apparatus according to Embodiment 1.

Further, FIG. 13 shows, as a result of simulation, the received constellation of an LSB signal formed by transmitting apparatus 100 according to the present embodiment. As is clear from the comparison of FIG. 13 with FIG. 10, it is possible to acquire almost an ideal received constellation by using transmitting apparatus 100. Further, although only a simulation result of an LSB signal is shown, it is possible to acquire similar characteristics from the USB signal.

As explained above, according to the present embodiment, FFT circuit 103 that performs a Fourier transform of transmission symbols; zero insertion circuit 104 that inserts zero in the components of either the USB component signal or the LSB component signal outputted from FFT circuit 103; IFFT circuit 105 that performs an inverse Fourier transform of the output of zero insertion circuit 104; and parallel-to-serial circuit 106 that performs parallel-to-serial conversion of the output of IFFT circuit 105, are provided, so that it is possible to acquire SSB signals having spectra that are sharply cut, and prevent power from leaking to neighboring channels.

Embodiment 2

Figure 14:
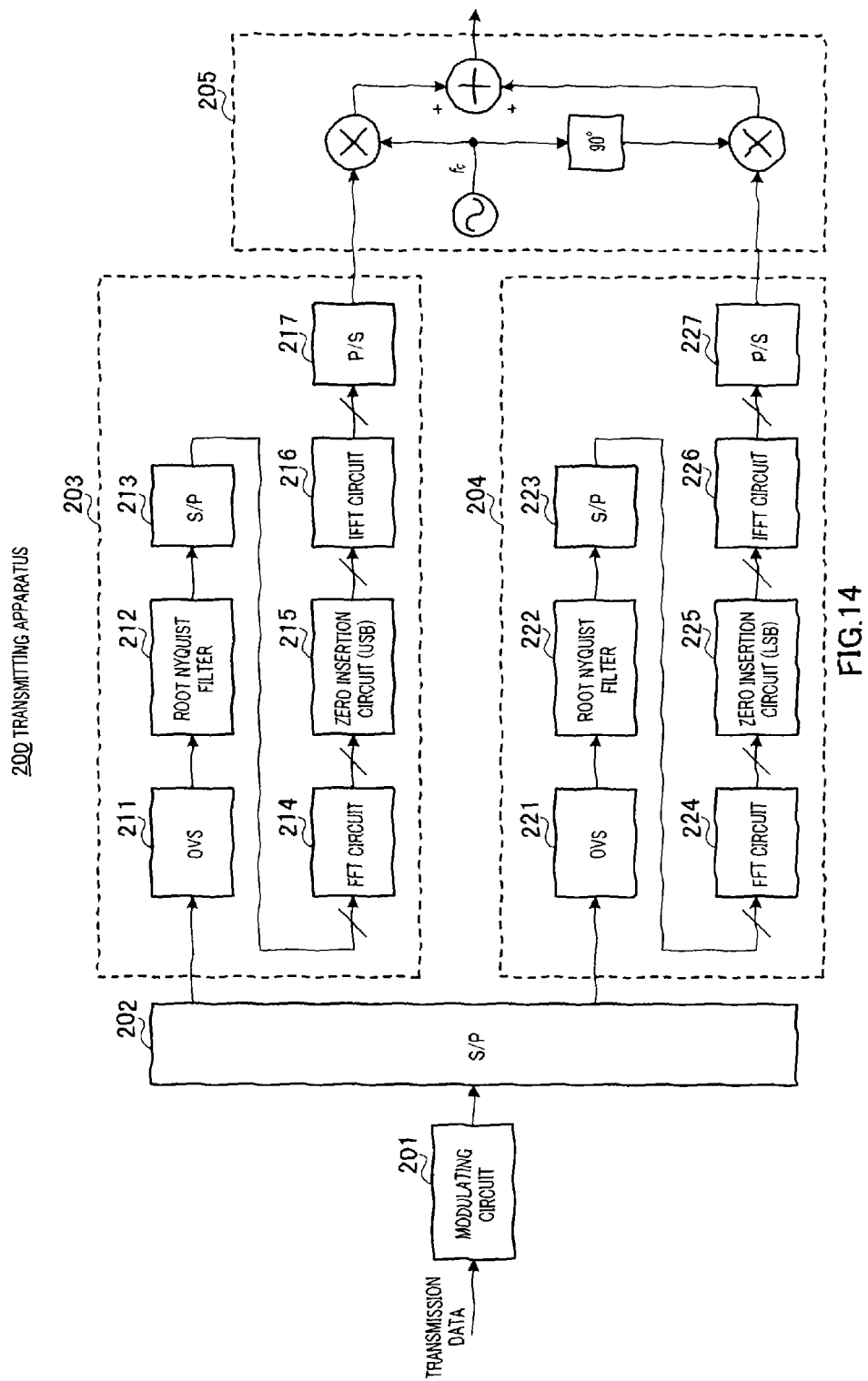
FIG. 14 is a block diagram showing the configuration of the transmitting apparatus according to Embodiment 2.

FIG. 14 shows the configuration of the transmitting apparatus according to the present embodiment. Transmitting apparatus 200 has: LSB signal forming section 203; USB signal forming section 204; and multiplexing section 205 that multiplexes an LSB signal formed in LSB signal forming section 203 and a USB signal formed in USB signal forming section 204.

Transmitting apparatus 200 first performs modulation processing such as QPSK modulation of transmission data in modulating circuit 201 and acquires modulated symbols, and divides the modulated symbols into two sequences by subsequent serial-to-parallel converting circuit (S/P) 202. Transmitting apparatus 200 sends out the signal of the first sequence to LSB signal forming section 203 and sends out the signal of the second sequence to USB signal forming section 204.

LSB signal forming section 203 inputs the modulated symbol of the first sequence to serial-to-parallel converting circuit (S/P) 213 through oversampler (OVS) 211 and root Nyquist filter 212. S/P 213 makes symbols parallel that are sequentially received as input, and outputs the symbols to FFT circuit 214. The output of FFT circuit 214 is received as input in zero insertion circuit 215. Zero insertion circuit 215 inserts zero in the USB components of the USB component signal among the USB component signal and LSB component signal outputted from FFT circuit 214, and outputs the USB component signal and LSB component signal to IFFT circuit 216. The signal outputted from zero insertion circuit 215 is converted into a time domain signal by IFFT circuit 216 and parallel-to-serial converting circuit (P/S) 217. In this way, an LSB signal is formed by LSB signal forming section 203.

Next, USB signal forming section 204 will be explained. USB signal forming section 204 differs from LSB signal forming section 203 in the components in which zero is inserted by zero insertion circuit 225. USB signal forming section 204 inputs a modulated symbol of the second sequence to serial-to-parallel converting circuit (S/P) 223 through oversampler (OVS) 221 and root Nyquist filter 222. S/P 223 makes symbols parallel that are sequentially received as input, and outputs the symbols to FFT circuit 224. The output of FFT circuit 224 is received as input in zero insertion circuit 225. Zero insertion circuit 225 inserts zero in the LSB components of the LSB component signal among the USB component signal and LSB component signal outputted from FFT circuit 224, and outputs the USB component signal and LSB component signal to IFFT circuit 226. The signal outputted from zero insertion circuit 225 is converted into a time domain signal by IFFT circuit 226 and parallel-to-serial converting circuit (P/S) 227. In this way, the USB signal is formed by USB signal forming section 204.

Multiplexing section 205 orthogonally-multiplexes these LSB signal and USB signal by multiplying the LSB signal formed in LSB signal forming section 203 and the USB signal formed in USB signal forming section 204, by carrier waves fc having phases shifted 90 degrees from each other.

Here, as explained in Embodiment 1, LSB signal forming section 203 forms an LSB signal which has the spectrum that is sharply cut and which leaks little power to neighboring channels, and USB signal forming section 204 forms a USB signal which has the spectrum that is sharply cut and which leaks little power to neighboring channels, so that the multiplexed LSB signal and USB signal are transmitted without interfering each other.

As explained above, the present embodiment provides LSB signal forming section 203 that has: first FFT circuit 214 that performs a Fourier transform of a transmission symbol; first zero insertion circuit 215 that inserts zero in the USB components of the USB component signal among the USB component signal and LSB component signal outputted from first FFT circuit 214; first IFFT circuit 216 that performs an inverse Fourier transform of the output of first zero insertion circuit 215; first parallel-to-serial converting circuit 217 that performs parallel-to-serial conversion of the output of first IFFT circuit 216, USB signal forming section 204 that has: second FFT circuit 224 that performs a Fourier transform of a transmission symbol; second zero insertion circuit 225 that inserts zero in the LSB components of the LSB component signal among the USB component signal and LSB component signal outputted from second FFT circuit 224; second IFFT circuit 226 that performs an inverse Fourier transform of the output of second zero insertion circuit 225; and second parallel-to-serial converting circuit 227 that performs parallel-to-serial conversion of the output of second IFFT circuit 226, and multiplexing section 205 that multiplexes the LSB signal formed in LSB signal forming section 203 and the USB signal formed in USB signal forming section 204.

By this means, when LSB signals and USB signals are multiplexed and transmitted, these signals can be transmitted without interfering each other.

INDUSTRIAL APPLICABILITY

The present invention is widely applicable to wireless communication equipment for making transmission signals SSB signals and transmitting the SSB signals.

The invention claimed is:

1. A transmitting apparatus that makes a transmission signal a single side band signal and transmits the single side band signal, the transmitting apparatus comprising:
   a Fourier transform circuit that performs a Fourier transform of a transmission symbol;
   a zero insertion circuit that inserts zero in components of one of an upper side band component signal and a lower side band component signal outputted from the Fourier transform circuit to form one of a lower side band signal and an upper side band signal, respectively;
   an inverse Fourier transform circuit that performs an inverse Fourier transform of an output of the zero insertion circuit; and
   a parallel-to-serial converting circuit that performs parallel-to-serial conversion of an output of the inverse Fourier circuit.

2. A transmitting apparatus that makes a transmission signal a single side band signal and transmits the single side band signal, the transmitting apparatus comprising:

a lower side band signal forming section that comprises:
- a first Fourier transform circuit that performs a Fourier transform of a transmission symbol;
- a first zero insertion circuit that inserts zero in upper side band components of an upper side band component signal among the upper side band component signal and a lower side band component signal outputted from the first Fourier transform circuit;
- a first inverse Fourier transform circuit that performs an inverse Fourier transform of an output of the first zero insertion circuit; and
- a first parallel-to-serial converting circuit that performs parallel-to-serial conversion of an output of the first inverse Fourier transform circuit;

an upper side band signal forming section that comprises:
- a second Fourier transform circuit that performs a Fourier transform of a transmission symbol;
- a second zero insertion circuit that inserts zero lower side band components of a lower side band component signal among an upper side band component signal and the lower side band component signal outputted from the second Fourier transform circuit;
- a second inverse Fourier transform circuit that performs an inverse Fourier transform of an output of the second zero insertion circuit; and
- a second parallel-to-serial converting circuit that performs parallel-to-serial conversion of an output of the second inverse Fourier transform circuit; and a multiplexing section that multiplexes a lower side band signal formed in the lower side band signal forming section and an upper side band signal formed in the upper side band signal forming section.

3. A single side band signal forming method comprising the steps of:
- performing by a transmitting apparatus a Fourier transform of a transmission symbol;
- inserting zero in components of one of an upper side band component signal and a lower side band component signal included in a signal subjected to the Fourier transform to form one of a lower side band signal and an upper side band signal, respectively; and
- performing an inverse Fourier transform of the signal which is subjected to the Fourier transform and in which the zero is inserted in the components.

4. A single side band signal forming method comprising the steps of:

forming a lower side band signal by:
- performing a Fourier transform of a transmission symbol;
- inserting zero in upper side band components of an upper side band component signal included in a signal subjected to the Fourier transform; and
- performing an inverse Fourier transform of the signal which is subjected to the Fourier transform and in which the zero is inserted the upper side band components;

forming an upper side band signal by:
- performing a Fourier transform of a transmission symbol;
- inserting zero in lower side band components of a lower side band component signal included in a signal subjected to the Fourier transform; and
- performing an inverse Fourier transform of the signal which is subjected to the Fourier transform and in which the zero is inserted in the lower side band components; and multiplexing the lower side band signal formed in the step of forming the lower side band signal and the upper side band signal formed in the step of forming the upper side band signal.

* * * * *